United States Patent [11] 3,633,978

[72] Inventor Paul Remillieux
Paris, France
[21] Appl. No. 52,222
[22] Filed July 6, 1970
[45] Patented Jan. 11, 1972
[73] Assignee Societe Anonyme DBA
[32] Priority July 3, 1969
[33] France
[31] 6922476

[54] PNEUMATIC ANTISKID BRAKING SYSTEM
2 Claims, 1 Drawing Fig.
[52] U.S. Cl. .................................................. 303/21 F,
188/181 A, 303/61, 303/68, 303/71
[51] Int. Cl. .................................................. B60t 8/00
[50] Field of Search .......................................... 188/181;
303/21, 24, 61–63, 68–69, 40, 71

[56] References Cited
UNITED STATES PATENTS
3,527,504  9/1970  Chouings et al. .............. 303/21 A
3,536,362  10/1970  Davis ............................ 303/21 F Primary Examiner—Milton Buchler
Assistant Examiner—John J. McLaughlin
Attorneys—W. N. Antonis and Plante, Hartz, Smith and Thompson ABSTRACT: A pneumatic antiskid braking system including control valve means adapted, when actuated by antiskid control means in response to a skidding of the vehicle wheels, to connect the two opposed chambers of the wheel brake actuator with one another so as to decrease the braking torque generated thereby. A normally closed exhaust valve controlled by piston means responsive to the differential pressure between these opposed chambers is provided to directly connect the motor chamber to a low fluid pressure reservoir when the above differential pressure falls below a predetermined value.

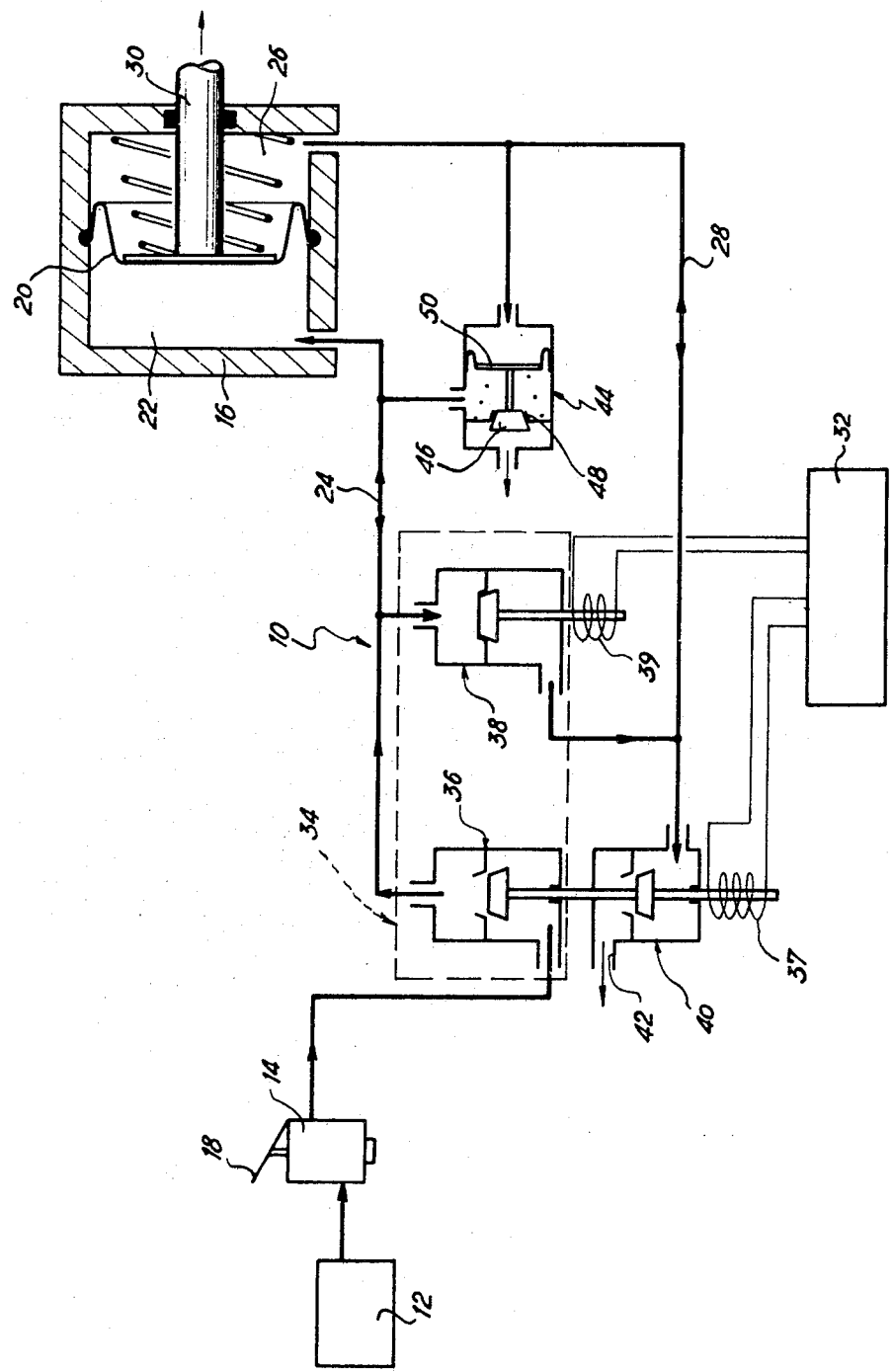

PNEUMATIC ANTISKID BRAKING SYSTEM

This invention relates to a pneumatic antiskid braking system for a vehicle provided with a pneumatic power assistance.

It has already been proposed pneumatic braking systems of the type wherein the variable volume motor chamber of a pneumatic brake actuator controlling the braking operation of at least one of the vehicle wheels is connected to a variable pneumatic braking pressure control source through an antiskid control valve means which are adapted, when actuated by an antiskid control unit in response to the skidding of said brake wheel, to terminate the connection between said control source and said motor chamber and thereafter to connect this latter to an exhaust conduit leading on the one hand to the variable volume exhaust chamber of said brake actuator opposite to said motor chamber and on the other hand to a relatively low fluid pressure reservoir (atmosphere) through a normally open shutoff valve operative to block fluid flow to said reservoir upon actuation of said antiskid control valve means by said antiskid control unit.

However, with such antiskid braking systems, whenever said antiskid control valve means are actuated, upon a braking operation on a low-friction coefficient road, to substantially equalize the respective pressures in said motor and exhaust chambers, it has been noted that, the braking force generated by the pressure-responsive movable wall of the brake actuator cannot be nullified due to the substantial pressure-responsive area exposed to the remaining motor chamber pressure of the output rod means connecting said movable wall to the movable brake-actuating member. Furthermore, due to the relatively limited effective fluid flow area of the exhaust conduit connecting said motor and exhaust chambers, it will be understood that, upon actuation of said antiskid control valve means, the rate of decrease of the braking force generated by the actuator is limited to a valve which varies as a function of the differential pressure between said motor and exhaust chambers. When such a differential pressure, as controlled by the antiskid control means reaches a relatively small value, upon braking on icy road for instance, the rate of the decrease of that differential pressure and thereby of the braking force is relatively slow that resulting in a substantial time delay response in the braking actuation of the vehicle wheels and thereby in a skidding thereof.

The main object of the invention is to avoid the above drawbacks.

According to the main feature of the invention, there is provided a pneumatic antiskid braking system of the type defined hereinabove wherein a normally closed exhaust valve, controlled by piston means responsive to the pneumatic differential pressure between said opposed motor and exhaust chambers, is provided to directly connect said motor chamber to said low-pressure reservoir (atmosphere) when said pressure differential falls below a predetermined value.

Other features and advantages of the invention will appear from the following description taken in connection with the accompanying drawing in which the single figure is a diagrammatic view of a pneumatic braking control system according to the invention.

Referring to the single figure of the drawing, reference numeral 10 generally designates a pneumatic braking system which mainly comprises a compressed air reservoir 12, a braking pressure control valve 14 and a pneumatic brake actuator 16. Reservoir 12 is adapted to be supplied with pressurized fluid by a conventional engine-driven air compressor (not shown) to supply the input of control valve 14 with air at a substantially constant high pressure. Valve 14 is of a conventional design and is adapted to control a variable braking pressure to actuator 16 as a function of the control actuation of the input valve control member 18 by the vehicle driver. Actuator 16 is also of a conventional design and may comprise a pressure-responsive movable wall or diaphragm 20 defining therein a variable volume motor chamber 22 normally connected to the output of control valve 14 by means of a supply conduit 24 and an opposed variable volume exhaust annular chamber 26 normally connected to a relatively low fluid pressure reservoir, such as the atmosphere, by means of an exhaust or return conduit 28. Diaphragm 20 is operatively connected to an output pushrod 30 sealingly reciprocable through the sidewall of the exhaust chamber 26 to be directly connected to the input actuating member (not shown) of a set of vehicle wheel brakes (not shown), or associated with a hydraulic master cylinder (not shown) controlling the hydraulic braking pressure to a set of wheel cylinders.

The braking system is further provided with an antiskid control unit 32 adapted to control actuation of a conventional antiskid control valve assembly, generally indicated as at 34, operatively arranged between the control valve 14 and the actuator 16 so as to terminate the communication between the output of control valve 14 and the motor chamber 22 and to connect the latter to an exhaust conduit leading to a relatively low fluid pressure reservoir in the even of a skidding of the vehicle wheel (or wheels) braked by actuator 16. In the shown embodiment, the valve assembly 34 comprises a normally open isolating valve 36 arranged in conduit 24 between control valve 14 and motor chamber 22 for controlling fluid flow therebetween, a normally closed exhaust valve 38 arranged between conduit 24 and exhaust conduit 28 for controlling fluid flow from chamber 22 to this latter conduit which is normally connected to the atmosphere. In the shown embodiment, the antiskid control unit 32 is of a conventional electronic design adapted to generate output electrical control signals capable of energizing solenoids 37 and 39 controlling actuation of valves 36 and 38 in response to predetermined skidding conditions of the braked wheel(s) as sensed by unit 32.

With a view to reducing the compressed air consumption upon successive actuations of the antiskid control means, there is provided a normally open shutoff valve 40 operatively arranged between the exhaust conduit 28 and an exhaust orifice 42 opening on the atmosphere. In the shown embodiment, the valve 40 is mechanically connected to valve 36 to be moved, in connection therewith, toward its closed position, so as to terminate the communication of exhaust conduit 28 with the atmosphere, upon energization of solenoid 37.

It will be understood that valves 36, 38 and 40 may be of any suitable known type and that valve 40 may be solid with valve 36 or actuated independently therefrom either by actuating means controlled by the antiskid unit 32 or even by a movable piston member responsive to the differential between the fluid pressure at the outlet of the control valve 14 and the fluid pressure in motor chamber 22.

The movable wall of actuator 16 being of a stepped design due to the nonnegligible effective area of the pushrod 30 subjected to the pneumatic pressure in the motor chamber 22, the system is provided with an exhaust valve 44 adapted to connect the motor chamber 22 to a relatively low pressure reservoir, such as the atmosphere, whenever the differential pressure between the motor chamber 22 and the exhaust annular chamber 26 falls below a predetermined value so as to substantially nullify the pressure effect on the effective area of push rod 30. In the shown embodiment, valve 44 comprises a check valve member 46 responsive to the pressure in conduit 24 leading to chamber 22 and normally urged in sealing engagement with a valve seat 48 connected to the atmosphere by a spring-loaded valve-actuating piston member 50 subjected to the differential between the pressure in the motor and exhaust chambers respectively.

I claim:

1. A pneumatic antiskid braking system of the type wherein the variable volume motor chamber of a pneumatic brake actuator controlling the braking operation of at least one of the vehicle wheels is connected to a variable pneumatic braking pressure control source through an antiskid control valve means which are adapted, when actuated by an antiskid control unit in response to the skidding of said braked wheel, to terminate the connection between said control source and said motor chamber and thereafter to connect this latter to an exhaust conduit leading on the one hand to the variable volume exhaust chamber of said brake actuator opposite to said motor chamber and on the other hand to a relatively low fluid pressure reservoir (atmosphere) through a normally open shutoff valve operative to block fluid flow to said reservoir upon actuation of said antiskid control valve means by said antiskid control unit, characterized in that a normally closed exhaust valve, controlled by piston means, responsive to the pneumatic differential pressure between said opposed motor and exhaust chambers, is provided to directly connect said motor chamber to said low-pressure reservoir (atmosphere) when said pressure differential falls below a predetermined value.

2. A pneumatic antiskid braking system according to claim 1, characterized in that said normally closed exhaust valve is comprised of a movable check valve member responsive to the pneumatic pressure in said motor chamber and connected to said piston means to be actuated thereby in response to the above mentioned differential pressure acting thereon.

* * * * *